(12) United States Patent
Adkisson

(10) Patent No.: US 7,346,824 B2
(45) Date of Patent: Mar. 18, 2008

(54) MATCH CIRCUIT FOR PERFORMING PATTERN RECOGNITION IN A PERFORMANCE COUNTER

(75) Inventor: Richard W. Adkisson, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 432 days.

(21) Appl. No.: 11/022,023

(22) Filed: Dec. 23, 2004

(65) Prior Publication Data

US 2005/0273682 A1 Dec. 8, 2005

Related U.S. Application Data

(60) Provisional application No. 60/576,763, filed on Jun. 3, 2004.

(51) Int. Cl.
*G01R 31/28* (2006.01)
*H03M 13/00* (2006.01)

(52) U.S. Cl. ................ 714/733; 714/709
(58) Field of Classification Search ............ None
See application file for complete search history.

(56) References Cited

U.S. PATENT DOCUMENTS

| | | | |
|---|---|---|---|
| 4,084,225 A * | 4/1978 | Anderson et al. ........... 711/206 |
| 5,651,112 A | 7/1997 | Matsuno et al. | |
| 5,729,678 A | 3/1998 | Hunt et al. | |
| 5,796,633 A | 8/1998 | Burgess et al. | |
| 5,819,053 A * | 10/1998 | Goodrum et al. .......... 710/100 |
| 5,835,702 A | 11/1998 | Levine et al. | |
| 5,880,671 A | 3/1999 | Ranson et al. | |
| 5,881,223 A | 3/1999 | Agrawal et al. | |
| 5,881,224 A * | 3/1999 | Ranson et al. ................ 714/47 |
| 6,112,317 A | 8/2000 | Berc et al. | |
| 6,112,318 A | 8/2000 | Jouppi et al. | |
| 6,360,337 B1 | 3/2002 | Zak et al. | |
| 6,463,553 B1 | 10/2002 | Edwards | |
| 6,487,683 B1 | 11/2002 | Edwards | |
| 6,502,210 B1 | 12/2002 | Edwards | |
| 6,546,359 B1 | 4/2003 | Week | |
| 6,557,119 B1 | 4/2003 | Edwards et al. | |
| 6,615,370 B1 | 9/2003 | Edwards et al. | |
| 6,684,348 B1 | 1/2004 | Edwards et al. | |
| 6,732,307 B1 | 5/2004 | Edwards | |
| 7,003,599 B2 * | 2/2006 | Warren et al. ................ 710/71 |
| 2002/0166012 A1 | 11/2002 | Natarajan et al. | |
| 2004/0210782 A1* | 10/2004 | Hsu .......................... 713/300 |

OTHER PUBLICATIONS

EP Search Report dated Sep. 16, 2005 (1 pg.).

\* cited by examiner

*Primary Examiner*—Cynthia Britt

(57) ABSTRACT

A match circuit connected to a bus carrying data is described. In one embodiment, the match circuit comprises logic for activating a match_mm signal when a selected N-bit portion of the data matches an N-bit threshold for all bits selected by an N-bit match mask ("mmask") and logic for activating a match_OR signal when at least one of one or more designated bits of the selected N-bit portion of the data is a logic 1 or if there are no designated bits.

22 Claims, 3 Drawing Sheets

US 7,346,824 B2

MATCH CIRCUIT FOR PERFORMING PATTERN RECOGNITION IN A PERFORMANCE COUNTER

PRIORITY UNDER 35 U.S.C. §119(e) & 37 C.F.R. §1.78

This nonprovisional application claims priority based upon the following prior U.S. provisional patent application entitled: "MATCH CIRCUIT FOR PERFORMING PATTERN RECOGNITION IN A PERFORMANCE COUNTER," Application No. 60/576,763, filed Jun. 3, 2004, in the name(s) of: Richard W. Adkisson, which is hereby incorporated by reference.

CROSS-REFERENCE TO RELATED APPLICATIONS

This application is related to U.S. patent application Ser. No. 11/021,259, filed Dec. 23, 2004 entitled "DURATION MINIMUM AND MAXIMUM CIRCUIT FOR PERFORMANCE COUNTER"; U.S. patent application Ser. No. 11/022,079, filed Dec. 23, 2004 entitled "PERFORMANCE MONITORING SYSTEM"; U.S. patent application Ser. No. 11/022,021, filed Dec. 23, 2004 entitled "EDGE DETECT CIRCUIT FOR PERFORMANCE COUNTER"; U.S. patent application Ser. No. 10/635,373, filed Aug. 6, 2003 entitled "MATCH CIRCUIT FOR PERFORMANCE COUNTER"; U.S. patent application Ser. No. 10/635,103, filed Aug. 6, 2003 entitled "DATA SELECTION CIRCUIT FOR PERFORMANCE COUNTER"; U.S. patent application Ser. No. 10/635,373, filed Aug. 6, 2003 entitled "ZEROING CIRCUIT FOR PERFORMANCE COUNTER"; and U.S. patent application Ser. No. 10/635,083, filed Aug. 6, 2003 entitled "GENERAL PURPOSE PERFORMANCE COUNTER"; U.S. patent application Ser. No. 10/945,056, filed Sep. 20, 2004 entitled "DECODED MATCH CIRCUIT FOR PERFORMANCE COUNTER"; all of which are hereby incorporated by reference in their entirety.

BACKGROUND

Increasing demand for computer system scalability (i.e., consistent price and performance and higher processor counts) combined with increases in performance of individual components continues to drive systems manufacturers to optimize core system architectures. One such systems manufacturer has introduced a server system that meets these demands for scalability with a family of application specific integrated circuits ("ASICs") that provide scalability to tens or hundreds of processors, while maintaining a high degree of performance, reliability, and efficiency. The key ASIC in this system architecture is a cell controller ("CC"), which is a processor-I/O-memory interconnect and is responsible for communications and data transfers, cache coherency, and for providing an interface to other hierarchies of the memory subsystem.

In general, the CC comprises several major functional units, including one or more processor interfaces, memory units, I/O controllers, and external crossbar interfaces all interconnected via a central data path ("CDP"). Internal signals from these units are collected on a performance monitor bus ("PMB"). One or more specialized performance counters, or performance monitors, are connected to the PMB and are useful in collecting data from the PMB for use in debugging and assessing the performance of the system of which the CC is a part. Currently, each of the performance counters is capable of collecting data from only one preselected portion of the PMB, such that the combination of all of the performance counters together can collect all of the data on the PMB. While this arrangement is useful in some situations, there are many situations in which it would be advantageous for more than one of the performance counters to access data from the same portion of the PMB. Additionally, it would be advantageous to be able to use the performance counters in the area of determining test coverage. Finally, it would be advantageous to be able to use the performance counters to detect any arbitrary binary pattern of up to M bits aligned on block boundaries. These applications are not supported by the state-of-the-art performance counters.

SUMMARY

In one embodiment, the invention is directed to a match circuit connected to a bus carrying data. The match circuit comprises logic for activating a match_mm signal when a selected N-bit portion of the data matches an N-bit pattern for all bits selected by an N-bit match mask ("mmask"); and logic for activating a match_OR signal when at least one of one or more designated bits of the selected N-bit portion of the data is a logic 1 or if there are no designated bits.

DETAILED DESCRIPTION OF THE DRAWINGS

Figure 1:
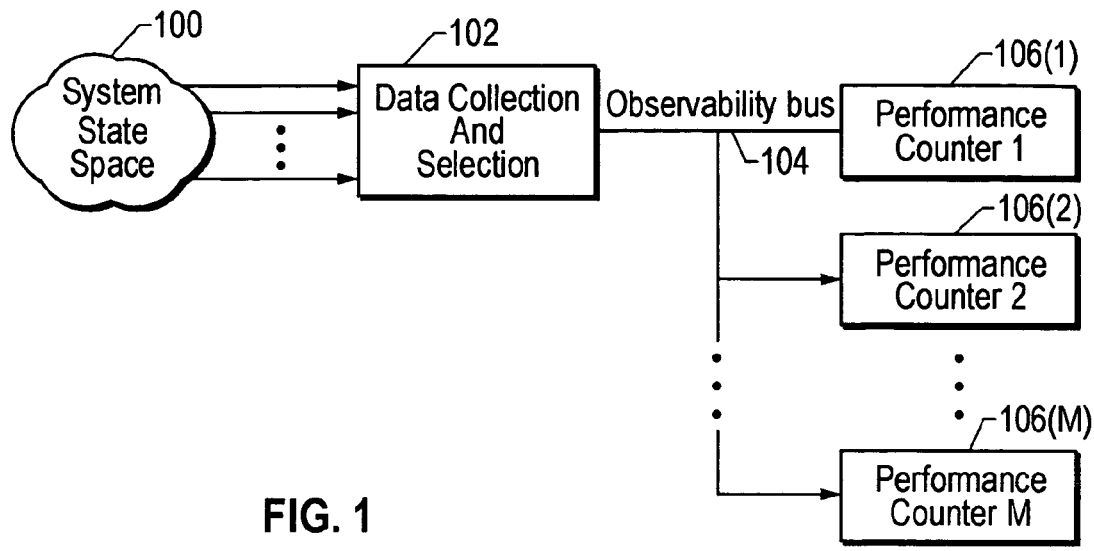
FIG. 1 is a block diagram illustrating general purpose data collection in a logic design.

In the drawings, like or similar elements are designated with identical reference numerals throughout the several views thereof, and the various elements depicted are not necessarily drawn to scale.

FIG. 1 is a block diagram of general purpose data collection in a logic design. As shown in FIG. 1, the state space 100 of a logic design under consideration is driven to data collection and selection logic 102. The logic 102 drives a D-bit data collection, or observability, bus 104 carrying a D-bit debug_bus signal to a plurality of performance counters 106(1)-106(M). In one embodiment, D is equal to 80, M is equal to 12, and performance counters 106(1)-106(M-1) are general purpose performance counters, while the remaining performance counter 106(M) increments on every clock cycle. As will be illustrated below, the general purpose performance counters are "general purpose" in that each of them is capable of accessing any bit of the 80-bits on the bus 104; moreover, all of them may access the same block of bits and do the same or different performance calculations thereon.

Figure 2:
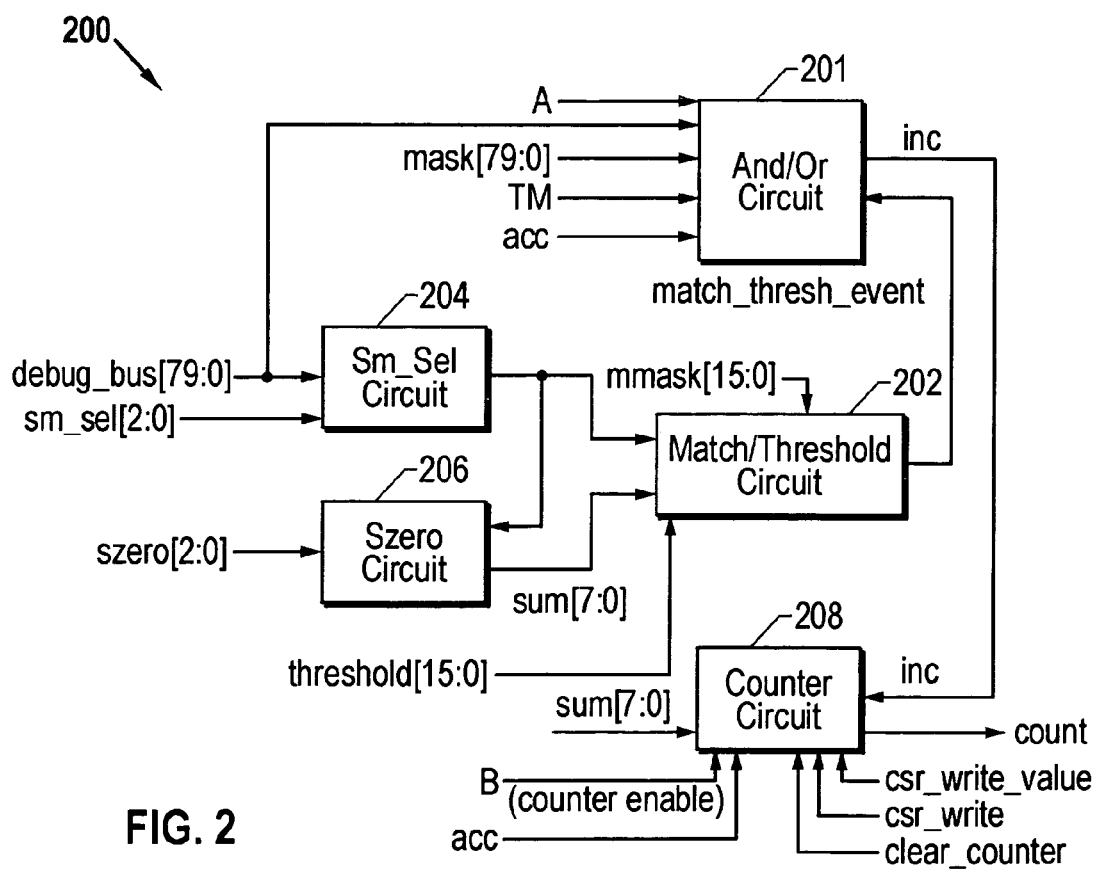
FIG. 2 is a block diagram of a general purpose performance counter according to one embodiment.

FIG. 2 is a block diagram of a general purpose performance counter 200, which is identical in all respects to each of the performance counters 106(1)-106(M-1) (FIG. 1), in accordance with one embodiment. As will be described in greater detail below, the performance counter 200 can be used to perform general purpose operations to extract performance, debug, or coverage information with respect to any system under test (SUT) such as, for instance, the system state space 100 shown in FIG. 1. The performance counter 200 includes an AND/OR circuit 201, a match/threshold circuit 202, an sm_sel circuit 204, an szero circuit 206, and a counter circuit 208.

Figure 3:
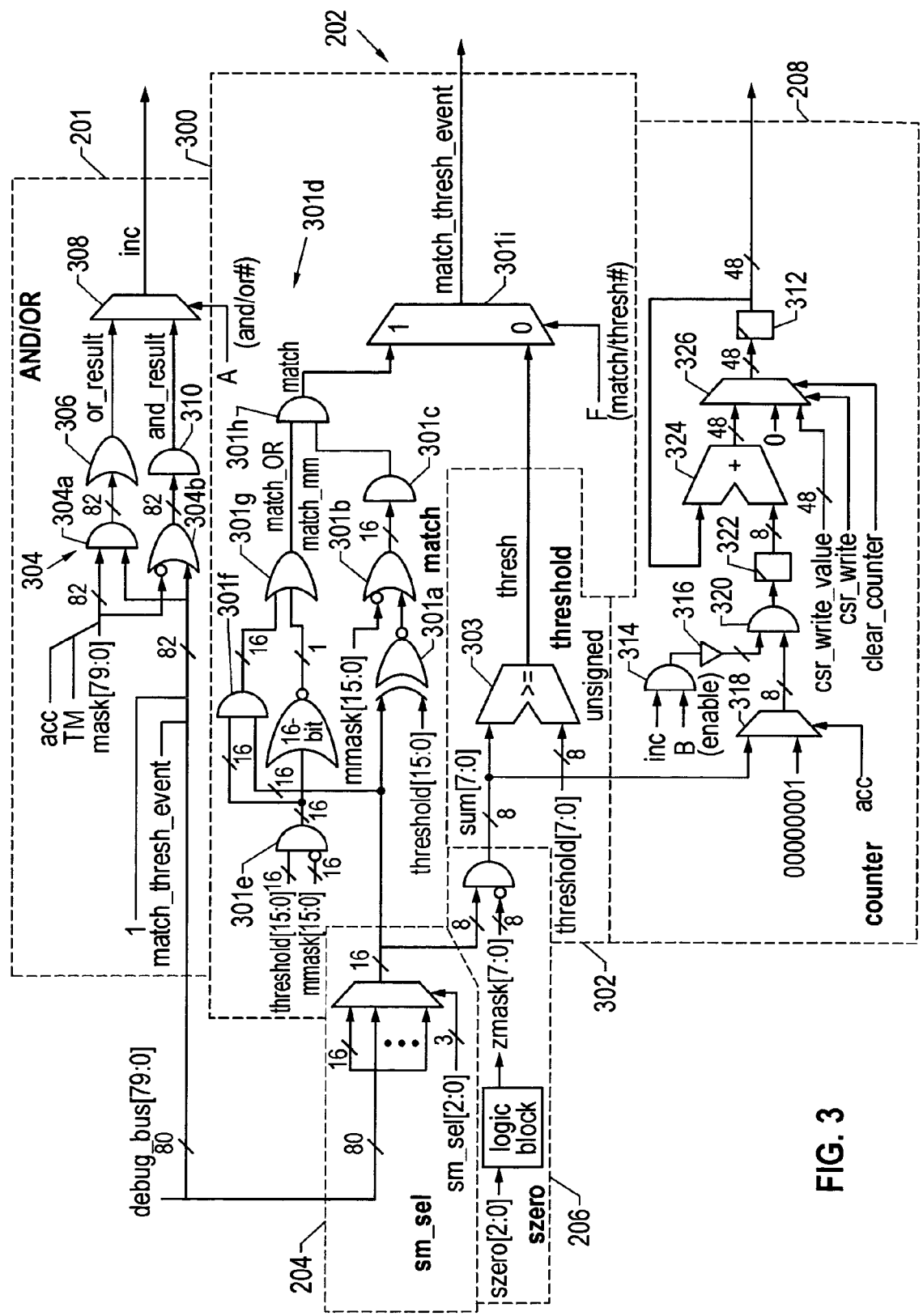
FIG. 3 is a more detailed block diagram of the general purpose performance counter of FIG. 2 wherein an embodiment of a match/threshold circuit is illustrated.

In general, the AND/OR circuit 201 enables access to all of the bits of the debug_bus signal coming into the performance counter 200 via the observability bus 104. In one embodiment, as illustrated in FIGS. 2 and 3, debug_bus is an 80-bit signal. When the AND/OR circuit 201 is operating in AND mode, the circuit activates an "inc" signal to the counter circuit 208 if all of the bits of the debug_bus signal plus two bits that are appended thereto, as will be described in greater detail below, that are of interest (as indicated by the value of an 80-bit "mask" plus two bits that are appended thereto) are set. When the AND/OR circuit 201 is operating in OR mode, the circuit activates the inc signal to the counter circuit 208 if any one or more of the bits of the debug_bus signal plus the two additional bits that are of interest (as indicated by the value the mask plus the two additional bits) are set.

When the match/threshold circuit 202 is operating in "match" mode, a match portion 300 (FIG. 3) of the circuit activates a match_thresh_event signal to the AND/OR circuit 201 when an N-bit portion of the debug_bus signal selected as described in greater detail below with reference to the sm_sel circuit 204 and the szero circuit 206 matches an N-bit threshold (or pattern) for all bits selected by an N-bit match mask ("mmask"). In one embodiment, for all bits of the selected N-bit debug bus signal portion that are "don't cares", the corresponding bit of mmask will be set to 0 and the corresponding bit of the threshold will be set to 0. For all bits of the selected N-bit debug bus signal portion that are "ORs" or "Rs", as will be described in detail below, the corresponding bit of mmask will be set to 0 and the corresponding bit of the threshold will be set to 1. Finally, for all bits of the selected N-bit debug bus signal portion that are not "don't cares" or "ORs", the corresponding bit of mmask will be set to 1.

The embodiment described herein enhances the normal match with an "R" term without using any control bits in addition to mmask (the mask) and threshold (the match). This embodiment can be used for any match circuit and for any pattern recognition; it is not limited to performance counters. In particular, a match occurs if any "R" bit is a one. This is the equivalent of an ORing of all "R" input bits. If all "R" bits are zero, there is no match.

The match_thresh_event signal is one of the two bits appended to the debug_bus signal. In the illustrated embodiment, N is equal to 16.

In general, when the match/threshold circuit 202 is operating in match mode, the match portion 300 detects in the debug_bus signal any arbitrary binary pattern of up to N bits aligned on 10-bit block boundaries. This includes matching a one, zero, or "don't care" ("X") on any bit. Additionally, as indicated above, in one embodiment, the detecting includes matching the results of an "OR" operation on all designated bits ("R"). This allows detection of specific packets or specific groups of packets or states.

In one embodiment, the match portion 300 comprises an exclusive NOR ("XNOR") circuit, represented in FIG. 3 by a single XNOR gate 301a, for bit-wise exclusive-NORing ("XNORing") a selected N-bit portion of the debug_bus signal output from the sm_sel circuit 204, as described in detail below, with an N-bit threshold which may be output from a control status register ("CSR")(not shown), for example. An N-bit signal output (i.e., a first intermediary output) from the XNOR circuit (represented by the XNOR gate 301a, although there may be as many as N such gates) is input to an OR circuit, represented in FIG. 3 by a single OR gate 301b, where it is bit-wise ORed with the inverse of the N-bit mmask, which may be provided by a CSR (not shown) in one embodiment. The N-bit output (i.e., a second intermediary output) of the OR circuit represented by the OR gate 301b (each of the N output bits being generated by a signal 2-input OR gate) are input to an N-bit AND gate 301c, the output of which comprises a one-bit "match_mm" signal.

The match circuit 300 further includes an enhancement portion 301d for matching the "R" bits. The enhancement portion 301d includes an AND circuit, represented in FIG. 3 by a single AND gate 301e, for bit-wise ANDing the inverse of the N-bit mmask with the N-bit threshold. The N-bit output of the AND circuit 301e is input to an AND circuit, represented in FIG. 3A by a single AND gate 301f, where it is bit-wise ANDed with the selected N-bit portion of the debug_bus signal output from the sm_sel circuit 204. The N-bit output of the AND circuit 301f is input to an N+1 input OR circuit 301g, where it is ORed with the single-bit NOR (provided by N-bit NOR gate) of the N-bit output of the AND circuit 301e to generate a single bit "match_OR" signal. The match_OR signal and the match_mm signal are input to an AND gate 301h, the output of which is input to one input of a two-input MUX 301i as a "match" signal. When the match/threshold circuit 202 is operating in match mode (as controlled by a selection control signal, e.g., the match/thresh# control signal), the match signal is output from the MUX 301i as the match_thresh_event signal to the AND/OR circuit, as described above.

As a result of the operation of the match portion 300, no extra random logic is required for decoding packets or states into "one-hot" signals, which are 1-bit signals that transition to a logic "1" for each value of the state. The match/threshold circuit 202 requires an N-bit pattern field and an N-bit mask field. In addition, the embodiment described herein can match a wider range of patterns than a conventional match circuit, which corresponds to a level of AND gates. The enhancement portion 301d adds a level of OR gates to the AND gates. For example, a conventional match circuit matches if all "1" bits are one, all "0" bits are zero, and all other bits are "don't care". The enhancement portion 301d generates a match if all "1" bits are one, all "0" bits are zero, all "X" bits are "don't care", and at least one of the "R" bits is one.

An example of the usefulness of the embodiment of the match circuit described herein is as follows. Given bits specifying a transaction type and four additional bits each indicating one of four destinations, a conventional match circuit cannot indicate a "match" if the specification transaction type is sent to any one of the four destinations. The embodiment illustrated herein can accomplish this result by using an "R" term for the four destination bits. As a result, the embodiment illustrated herein can add a level of logic without using any more control bits, thus allowing more patterns to be matched.

To reduce the number of control bits required, in the embodiment illustrated in FIG. 3, the N-bit pattern field is the same field used for a threshold portion 302 of the circuit 202, as described below, as it is unlikely that both the match portion 300 and the threshold portion 302 will be used at the same time, especially if the sm_sel circuit 204 supplies the same N bits to both.

When the match/threshold circuit 202 is operating in "threshold" mode, the threshold portion 302 of the circuit 202 activates the match_thresh_event signal to the AND/OR circuit 201 when an S-bit portion of the debug_bus signal selected and zeroed as described in greater detail below with reference to the sm_sel circuit 204 and the szero circuit 206 is equal to or greater than the threshold. In the illustrated embodiment, S is equal to N/2, or 8.

A compare circuit 303 of the threshold portion 302 compares a sum[7:0] signal output from the szero circuit 206, described below, with the least significant S bits of the N-bit threshold signal and outputs a logic one if the former is greater than or equal to the latter and a zero if it is not. The output of the compare circuit 303 is input to a second input of the MUX 301i as a thresh signal. When the match/threshold circuit 202 is operating in threshold mode, the thresh signal is output from the MUX 301i as the match_thresh_event signal to the AND/OR circuit, as described above.

The sm_sel circuit 204 selects an N-bit portion of the debug_bus signal aligned on a selected 10-bit block boundary into both the match portion 300 and the threshold portion 302 (FIG. 3) of the match/threshold circuit 202 and to a sum input of the counter circuit 208. As previously stated, in the illustrated embodiment, N is equal to 16. The szero circuit 206 zeroes out none through all but one of S bits aligned on a selected 10-bit block boundary into the threshold portion 302 of the match/threshold circuit 202 and the sum input of the counter circuit 208. In the illustrated embodiment, S is equal to eight. The selected 10-bit block boundary is identified by the value of a three-bit control signal sm_sel input to the sm_sel circuit 204.

Additional details regarding the operation of the sm_sel circuit 204 and the szero circuit 206 are provided in U.S. patent application Ser. No. 10/635,103, filed Aug. 6, 2003 entitled "DATA SELECTION CIRCUIT FOR PERFORMANCE COUNTER" and U.S. patent application Ser. No. 10/635,373, filed Aug. 6, 2003 entitled "ZEROING CIRCUIT FOR PERFORMANCE COUNTER".

In one embodiment, each general purpose performance counter, such as the performance counter 200, is 48 bits plus overflow. The performance counter 200 is general purpose in that it looks at all D bits of the debug_bus signal for an event mask plus two extra events, eight separate selections of 16 bits for the match compare operation and eight separate selections of eight bits for the threshold compare and the accumulate operations. The eight bits for the threshold compare and the accumulate operations are the bottom eight bits of the 16 bits selected for the match compare operation. Those 16 bits are aligned to 10 slot boundaries as shown in an exemplary mapping arrangement illustrated in FIG. 4.

Figure 4:
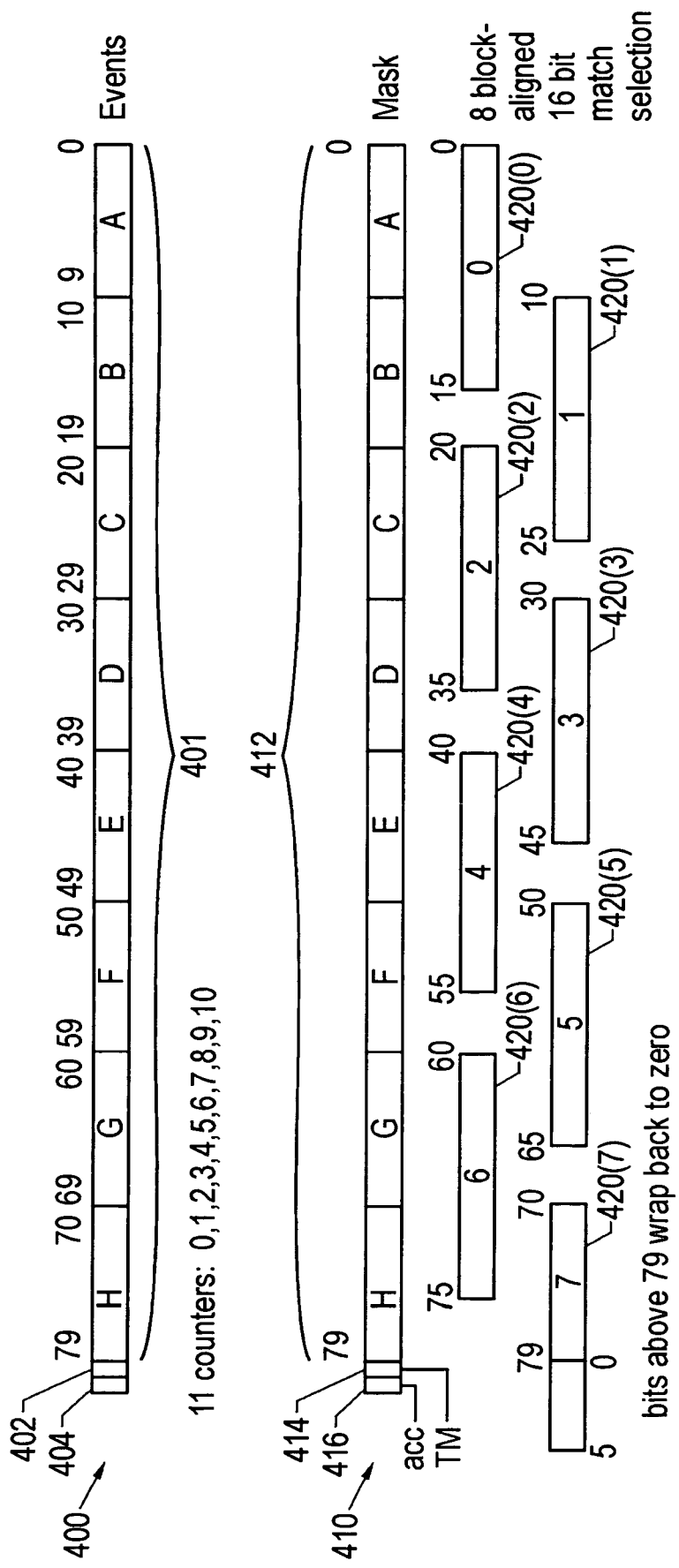
FIG. 4 illustrates a method in which signals are mapped from an observabilty bus to a performance counter in accordance with one embodiment.

In FIG. 4, an events signal 400 comprises the debug_bus signal, designated in FIG. 4 by reference numeral 401, the match_threshold_event signal, designated by reference numeral 402 and a logic 1 bit, designated by reference numeral 404. The debug_bus signal 401 comprises bits [79:0] of the events signal 400; the match_threshold_event signal 402 comprises bit [80] of the events signal, and the logic 1 bit 404 comprises bit [81] of the events signal.

As best illustrated in FIG. 3, the events signal 400 (i.e., the debug_bus signal with the match_threshold_event signal and the logic 1 appended thereto) are input to a first logic stage 304 of the AND/OR circuit 201 for purposes that will be described in greater detail below.

Referring again to FIG. 4, a composite mask signal 410 comprises an 80-bit mask signal, designated by a reference numeral 412, a match_threshold_event mask ("TM") bit, designated by reference numeral 414, and an accumulate bit ("acc"), designated by reference numeral 416. The mask signal 412 comprises bits [79:0] of the composite mask signal 410; the TM bit 414 comprises bit [80] of the composite mask signal, and the acc bit 416 comprises bit [81] of the composite mask signal. As best illustrated in FIG. 3, each bit of the composite mask 410 (i.e., the mask signal with the TM and acc bits appended thereto) is input to the first logic stage 304 of the AND/OR circuit 201 for purposes that will be described in greater detail below.

Continuing to refer to FIG. 4, eight 10-bit-block-aligned 16-bit match selections are respectively designated by reference numerals 420(0)-420(7). In particular, the selection 420(0) comprises bits [0:15]; the selection 420(1) comprises bits [10:25]; the selection 420(2) comprises bits [20:35]; the selection 420(3) comprises bits [30:45]; the selection 420(4) comprises bits [40:55]; the selection 420(5) comprises bits [50:65]; the selection 420(6) comprises bits [60:75]; and the selection 420(7) comprises bits [70:5] (bits above 79 wrap back to zero.

Referring again to FIG. 3, the first logic stage 304 comprises an AND portion, represented by an AND gate 304a, for bit-wise ANDing the events signal 400 with the composite mask signal 410, and an OR portion, represented by an OR gate 304b, for bit-wise ORing the inverse of the composite mask signal 410 with the events signal 400. It will be recognized that, although represented in FIG. 3 as a single two-input AND gate 304a, the AND portion of the first logic stage 304 actually comprises 82 two-input AND gates. Similarly, the OR portion of the first logic stage 304 comprises 82 two-input OR gates identical to the OR gate 304b.

The outputs of the AND portion of the first logic stage 304 are input to an 82-input OR gate 306, the output of which is input to one input of a two-input MUX 308 as an "or_result". Similarly, the outputs of the OR portion of the first logic stage 304 are input to an 82-input AND gate 310, the output of which is input to the other input of the MUX 308 as an "and_result". A control signal ("and/or#") which may originate from a CSR (not shown) controls whether the AND/OR circuit 201 functions in AND mode, in which case the and_result is output from the MUX 308 as the inc signal, or in OR mode, in which case the or_result is output from the MUX as the inc signal.

As a result, when the AND/OR circuit 201 is operating in the AND mode, the inc signal comprises the and_result signal and will be activated when all of the bits of the events signal 400 that are of interest as specified by the composite mask 410 are set. When the AND/OR circuit 201 is operating in OR mode, the inc signal comprises the or_result signal and will be activated when any one of the bits of the events signal 400 that are of interest as specified by the composite mask 410 is set.

The acc bit 416 of the composite mask 410 is CSR-settable. Setting the TM bit 414 in the composite mask 410 designates the match_thresh_event signal in the events signal as a bit of interest; not setting the TM bit in the composite mask will cause the value of the match_thresh_event signal in the events signal 400, and hence the result of any match or threshold operation performed by the match/threshold circuit 202, to be ignored.

Continuing to refer to FIG. 3, the operation of an embodiment of the counter circuit 208 will be described in greater detail. The counter circuit 208 is an X bit counter that can hold, increment by one, add S bits, clear, or load a value into a count value register 312. Other processing may also occur in order to read the value of the register 312. In the embodiment illustrated in FIG. 3, X is equal to 48. Counter circuit 208 operation is enabled by setting a counter enable signal B, which comprises one input of a two-input AND gate 314. The other input of the AND gate 314 is connected to receive the inc signal from the AND/OR circuit 201. Accordingly, when the counter circuit 208 is enabled and the inc signal is activated, a logic one is output from the AND gate 314. In any other case, the output of the AND gate 314 will be a logic zero. The output of the AND gate 314 is replicated by an 8× replicator 316 and the resulting 8-bit signal is bit-wise ANDed with an 8-bit signal output from a MUX circuit 318. The inputs to the MUX circuit 318 are the sum[7:0] signal output from the szero circuit 206 and an 8-bit signal the value of which is [00000001]. The sum[7:0] signal will be output from the MUX circuit 318 when the acc signal is activated; otherwise, the [00000001] signal will be output from the MUX circuit.

An AND circuit, represented by an AND gate 320, bit-wise ANDs the signals output from the replicator 316 and from the MUX circuit 318. The resulting 8-bit signal is input to a register 322. An adder 324 adds the 8-bit signal stored in the register 322 to the 48-bit sum stored in the count value register 312. The new sum output from the adder 324 is input to a MUX circuit 326. Two other sets of inputs to the MUX circuit 326 are connected to a logic zero and a csr_write_value, respectively. When a csr_write enable signal to the MUX circuit 326 is activated, the value of csr_write_value is output from the MUX circuit 326 and written to the count value register 312. In this manner, a value can be loaded into the count value register 312. Similarly, when the clear_counter signal is asserted, 48 zero bits are output from the MUX circuit 326 to the count value register 312, thereby clearing the register.

If neither the csr_write signal nor the clear_counter signal is asserted and the acc signal is asserted, the output of the adder 324 is written to the count value register 312, thereby effectively adding S bits (i.e., the value of the sum[7:0] signal) to the previous value of the count value register 312. Not enabling the counter circuit 208 results in the count value register 312 being held at its current value. Finally, to increment the value of the count value register 312 by one, the counter circuit 208 must be enabled, the inc signal must be asserted, and the acc signal must not be asserted.

As described in detail above, FIG. 4 illustrates that the entire data collection bus 104 (FIG. 1) is available for all of the performance counters represented by the performance counter 200, making them general purpose. All D bits of the debug_bus signal can be used by the AND/OR circuit 201. N bits aligned on block boundaries can be selected by the sm_sel circuit 206, enabling full coverage of the observabilty bus 104.

Previous performance counters could only match ones or use thresholding. The embodiment described herein, using the match portion 300 of the match/threshold circuit 202, can match ones, zeros, "don't care", and "ORed" bits. It can also match groups of packets and states. For example, it can match all packets with a "R0XR1" pattern in bit positions 6 through 2 regardless of the values of the other bits or bit 4. It eliminates the need for the logic being analyzed (i.e., debugged, performance-counted, or test-covered, et cetera) to have extra logic to decode specific patterns into one-hot signals, rendering a performance counter in which it is implemented more general purpose.

As previously mentioned, prior art performance counter designs were not general purpose, in that they have limited range and are designed solely for performance calculations and debug of a system design. The embodiments described herein are general purpose, in that the AND/OR circuit can perform calculations on the entire range of the data collection bus 104. The embodiments also incorporate the concept of coverage. In particular, by observing specific states in a logic design, the designer can determine how much of the state space thereof is being covered by the test vectors of a test suite. The designer can thereby gauge whether more tests need to be run and what needs to be added to fully test the entire design.

An implementation of the invention described herein thus provides a general purpose performance counter. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown may be implemented using CSRs, it will be appreciated that control signals may also be applied in a variety of other manners, including, for example, directly or may be applied via scan registers or Model Specific Registers ("MSRs"). Additionally, although specific bit field sizes have been illustrated with reference to the embodiments described, e.g., 16-bit threshold for pattern matching (where the bottom 8 bits are used for the threshold), 80-bit mask signal, 3-bit sm_sel, et cetera, various other implementations can also be had.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A match circuit connected to a bus carrying data, the match circuit comprising:
   logic for activating a match_mm signal when a selected N-bit portion of the data matches an N-bit threshold for all bits selected by an N-bit match mask ("mmask"); and
   logic for determining bits of the selected N-bit portion that are designated as "OR" bits based on corresponding bits of the match mask and the threshold and activating a match_OR signal when at least one of the designated bits of the selected N-bit portion of the data is a logic 1 or if there are no designated bits.

2. The match circuit of claim 1 further comprising logic for activating a match signal when at least one of the match_mm and match_OR signals is activated.

3. The match circuit of claim 1 wherein N is equal to sixteen.

4. The match circuit of claim 1 wherein the bus is 80 bits wide.

5. The match circuit of claim 4 wherein the data comprises eight 16-bit portions aligned on 10-bit blocks.

6. The match circuit of claim 5 wherein the selected portion comprises one of the eight 16-bit portions.

7. The match circuit of claim 1 wherein the logic for activating a match_mm signal comprises:
   logic for identifying a binary bit of the selected N-bit data portion for which a corresponding bit of mmask is a logic 1; and logic for comparing the identified binary bit with a corresponding bit of the threshold and outputting a binary bit indicative of whether the compared bits match.

8. The match circuit of claim 1 wherein the logic for determining bits of the selected N-bit portion that are designated as "OR" bits comprises:
   logic for identifying each binary bit of the selected N-bit data portion for which a corresponding bit of mmask is a logic 0 and for which a corresponding bit of the threshold is a logic 1.

9. Circuitry connected to a bus carrying data for analyzing a selected portion of the data, the circuitry comprising:
   logic means for activating a match_mm signal when the selected portion of the data includes a specified bit pattern;
   logic means for determining bits of the selected portion that are designated as "OR" bits based on corresponding bits of the match mask and the threshold and for activating a match_OR signal when at least one of the "OR" bits of the selected portion of the data is a logic 1 or if there are no "OR" bits; and
   logic means for activating a match signal when at least one of the match_mm and match_OR signals is activated.

10. The circuitry of claim 9 wherein the logic means for activating a match_mm signal comprises:
    an exclusive NOR ("XNOR") circuit operating to perform a bit-wise XNOR operation between the selected data portion and threshold data, wherein the threshold data is as wide as the selected data portion;
    an OR circuit for ORing an inverted mask ("mmask") with the output of the XNOR circuit; and
    an AND circuit operating to AND the OR circuit's output to generate the match_mm signal.

11. The circuitry of claim 9 wherein the logic means for activating a match_OR signal comprises:
    a first AND circuit operating to perform a bitwise AND operation between threshold data, wherein the threshold data is as wide as the selected data portion, and an inverted mask ("mmask");
    a second AND circuit operating to perform a bitwise AND operation between an output of the first AND circuit and the selected data portion; and
    an OR circuit operating to perform an OR operation between an output of the second AND circuit and a single-bit NOR of the output of the first AND circuit.

12. The circuitry of claim 9 wherein the logic means for activating a match signal comprises a two input AND gate connected to receive the match_mm and match_OR signals, wherein an output of the AND gate comprises the match signal.

13. The circuitry of claim 9 wherein the bus is 80 bits wide.

14. The circuitry of claim 13 wherein the data comprises eight 16-bit portions aligned on 10-bit blocks.

15. The circuitry of claim 14 wherein the selected portion comprises one of the eight 16-bit portions.

16. A method of operating a match circuit connected to a bus carrying data for analyzing a selected portion of the data, the method comprising:
    activating a match_mm signal when the selected portion of the data includes a specified bit pattern;
    determining bits of the selected portion of the data that are designated as "OR" bits based on corresponding bits of a mask and a threshold;
    activating a match _OR signal when at least one of the bits of the selected portion of the data that is designated "OR" is a logic 1 or if there are no bits designated "OR"; and
    activating a match signal when at least one of the match_mm and match_OR signals is activated.

17. The method of claim 16 wherein the activating a match_mm signal comprises:
    performing a bit-wise exclusive NOR operation between the selected data portion and threshold data that is as wide as the selected data portion to create a first intermediary output;
    performing an OR operation between the first intermediary output and an inverted mask ("mmask") to create a second intermediary output; and
    performing an AND operation on the second intermediary output to generate the match_mm signal.

18. The method of claim 16 wherein the activating a match_OR signal comprises:
    performing a bitwise AND operation between threshold data, wherein the threshold data is as wide as the selected data portion, and an inverted mask ("mmask") to generate a first intermediary output;
    performing a bitwise AND operation between the first intermediary output and the selected data portion to generate a second intermediary output; and
    performing an OR operation between the second intermediary output and a NOR of the output of the first AND circuit to generate the match_OR signal.

19. The method of claim 16 wherein the activating a match signal comprises performing an AND operation on the match_mm and match_OR signals to generate the match signal.

20. The method of claim 16 wherein the selected portion of the data comprises 16 bits.

21. The method of claim 16 wherein the data comprises eight 16-bit portions aligned on 10-bit blocks.

22. The method of claim 21 wherein the selected portion comprises one of the eight 16-bit portions.

* * * * *